United States Patent

Chiron et al.

[15] 3,697,901

[45] Oct. 10, 1972

[54] MICROSTRIP CIRCUITS WHEREIN NON-MAGNETIC INSULATING SUBSTRATE AND MAGNETIC INSERT HAVE SAME CRYSTALLINE STRUCTURE

[72] Inventors: Bernard Chiron; Andre Deschamps; Louis Duffau, all of Paris, France

[73] Assignee: Societe Lignes Telegraphiques et Telephoniques, Paris, France

[22] Filed: Dec. 7, 1970

[21] Appl. No.: 95,679

[52] U.S. Cl. ............333/84 M, 252/62.59, 252/63.2, 252/63.5, 333/1.1, 333/10

[51] Int. Cl. ............................H01p 3/08, H01p 1/32

[58] Field of Search ...........333/1.1, 24.1, 24.2, 84 M

[56] References Cited

UNITED STATES PATENTS 3,456,213 7/1969 Hershenov..................333/1.1

*Primary Examiner*—Paul L. Gensler
*Attorney*—Kemon, Palmer & Estabrook

[57] ABSTRACT

Microwave integrated circuits are designed as microstrip patterns on insulating non magnetic substrates with the same crystalline structure as magnetic materials operating in the same frequency band. At X band, solid solutions of ferrites with titanates are described and a garnet-like non magnetic material is preferred at L band. Magnetic parts are set into the substrate.

3 Claims, 9 Drawing Figures

MICROSTRIP CIRCUITS WHEREIN NON-MAGNETIC INSULATING SUBSTRATE AND MAGNETIC INSERT HAVE SAME CRYSTALLINE STRUCTURE

BACKGROUND OF THE INVENTION AND PRIOR ART

Microwave integrated circuits are hybrid circuits made of microstrip lines interconnected with lines electronic components added on the same substrate carrying the lines. This type of design requires dielectric substrates which should meet special requirements due to microwave band operation. These requirements deal mainly with the dielectric loss and the permittivity values at the operating frequency. Two different circuit families fall within the field in which the present invention lies. These are based only on the electric field properties and circuits based on both the electric and magnetic field properties. Nonmagnetic substrates are used to design the former which are made of alumina ; the circuits of the second family should incorporate magnetic (high permeability) material at the places where the magnetic fields are to be established. In this case, two types of design are available. In the first type, the whole circuit is printed on a magnetic substrate and a localized external magnetic field is applied where needed. Such designs are described for instance in U.S. Pat. No. 3,560,892 and French Pat. No. 1,572,321. The other type of design uses a nonmagnetic substrate which is provided with holes filled with magnetic material parts set where required. When circuits of the first type are to be interconnected with other circuits to build up a complete unit, interconnection between the two types of circuit is difficult due to the differences in the physical characteristics of the substrate materials,. Indeed, alumina and the other nonmagnetic dielectrics currently used as microwave substrates have linear expansion coefficients which are very different from the expansion coefficients of the magnetic materials used in such circuits. For instance, the expansion coefficient of high purity alumina is about $10 \times 10^{-6}$ while expansion coefficient of garnets is about $6 \times 10^{-6}$ and ferrites of the spinel type have expansion coefficient between 5 and $7 \times 10^{-6}$. It is therefore difficult to integrate a microwave unit, specially when it is operated at high energy level, that is at high temperature. When the second type of magnetic circuit design is used, interconnection between the magnetic inlaid and the nonmagnetic substrate is made either by thick films or fine wires welded at both end by thermocompression. The stress which develops at these interconnections due do the difference of expansion coefficients is sufficient to break them loose which is of course a cause of failure of the whole unit.

BRIEF DISCLOSURE OF THE INVENTION

According to the present invention, microwave integrated circuits are printed on a nonmagnetic substrate obtained through a modification in the chemical composition of the magnetic material used at the same operating frequency. The identity between the physical characteristics of both the nonmagnetic and the magnetic substrates is achieved since both materials show the same crystallographic network. For instance, when the magnetic materials are of the type described in U.S. Pat. No. 3,457,174, the substrate will be made of a dielectric material made of the same chemical components with a ratio of titanate between 90 and 100 percent instead of the ratio being between 8.5 and 90%. In the case of yttrium aluminum garnet a nonmagnetic garnet corresponds to the formula $Y_3\,Fe\,Al_4\,O_{12}$ and more precisely to $Y_3\,Fe_{5-x}\,Al_x\,O_{12}$ with $x > 2.5$ The Curie temperature of this type of material is below $-50°$ C. In the frequency range where Ni - Zn ferrites are used, the substrate is made of an insulator corresponding to the formula $Ni_{1-a}\,Zn_a\,Fe_2O_4$ with a >0.9. For all these compositions, the Curie temperature is below $-50°$ C.

DETAILED DESCRIPTION

The microwave integrated circuits according to the present invention are made of thick film and components added on nonmagnetic dielectric substrate of the same crystalline structure as the magnetic material used at the operating frequency with inlaid or pieces of magnetic material embedded where required in the substrate. The main advantage of the design according to the invention with respect to the circuit printed on homogenous magnetic substrate is a substantial reduction of losses at the operating frequencies. For instance, the garnet type non magnetic material mentioned above shows a loss tangent angle of $3 \times 10^{-4}$ at 3 GHz. In order to fully explain the invention the following examples of designs are given as an illustration of the invention:

BRIEF DESCRIPTION OF THE DRAWINGS

FIGS. 1 and 1A shows the design of a transmission line consisting of a circuit printed on a substrate 1 made of the material following the formula :

Figures 1, 1A:
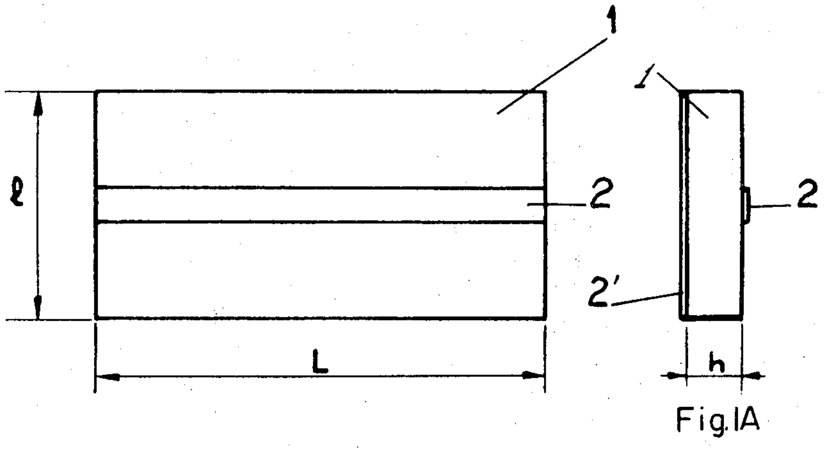
FIGS. 1 and 1A show a transmission line according to the invention.

$$5\,[(0.92MgO \cdot 18MnO \cdot 8Fe_2O_3 \cdot 1(TiO_2\ NiO)]\ 95\ (TiO_2\,2MgO) \quad (1)$$

This material is a solid solution of oxides and titanates which crystallize in the spinel group. The general formula for these materials is :

$$X\,[xLO, yR_2O_3, z(TO_2QO)]\ Y\,(TO_2\,2NO) \quad (2)$$

where L,Q and N are one or several bivalent metals corresponding to the following ions :

$Fe^{++}, Mn^{++}, Co^{++}, Ni^{++}, Mg^{++}, Za^{++}$ ;

and R is one or several trivalent metals corresponding to the following ions :

$Fe^{+++}, Cr^{+++}, Al^{+++}, Mn^{+++}$ ;

and T is tetravalent metal titanium ;

where $X + Y = 100$ with $90 < Y < 100$ and $0.96 \leq x \leq 1.04$ $y + z = 2 - x$ and $0.01 \leq z \leq 0.9$.

This family of solid solutions, with different values for the ratios X, Y, $x$, $y$, $z$ leads to magnetic materials most suitable for microwave operation as explained in U.S. Pat. No. 3,457,174 filed Dec. 27, 1965.

Measurements on this type of material show that the Curie temperature decreases when Y increases and reaches values lower than 100° C for values of Y higher than 65. At 3 GHz, the permittivity is about 14 and the dielectric losses are lower than $3 \times 10^{-4}$. The permeability of this material is very near unity in a large band of values of magnetic fields down to temperatures lower than 0° C. The substrate is 50 millimeter long (L), 25 millimeter wide ($l$) and 1 millimeter thick ($h$). On the upper face of the substrate lies strip 2 which is made of a sold film 10 micron thick deposited through cathodic sputtering followed by electrolytic thickening. The width of this strip is 5 millimeters so that the impedance of the line is about 50 ohms at 3 GHz. The other face of the substrate is coated with a continuous metal film 2'.

Figure 2:
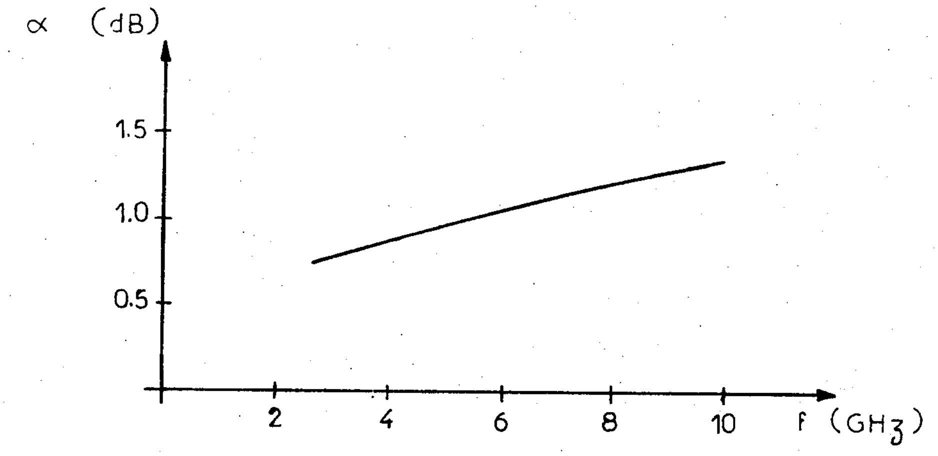
FIG. 2 shows a loss characteristic of the line of FIG. 1.

FIG. 2 shows the insertion loss of such a line between 3 and 10 GHz in dB. As shown, the insertion loss is 0.8 dB at 3 GHz, 1 dB at 6 GHz and 1.5 dB at 9.5 GHz. The insertion loss at 3 GHz of a line of the same geometry coated on an alumina substrate is 0.7 dB. While it is true that a line in accordance with the present invention is not electrically as good as a line deposited on alumina, the difference between the losses is less than 1 percent and is therefore, not technically important. The expansion coefficient of the solid solution used as a substrate according to the present invention is about $6 \times 10^{-6}$. It is the same value as the expansion coefficient of the magnetic materials of the spinel type which are described in the above mentioned U.S. Patent.

Figure 3:
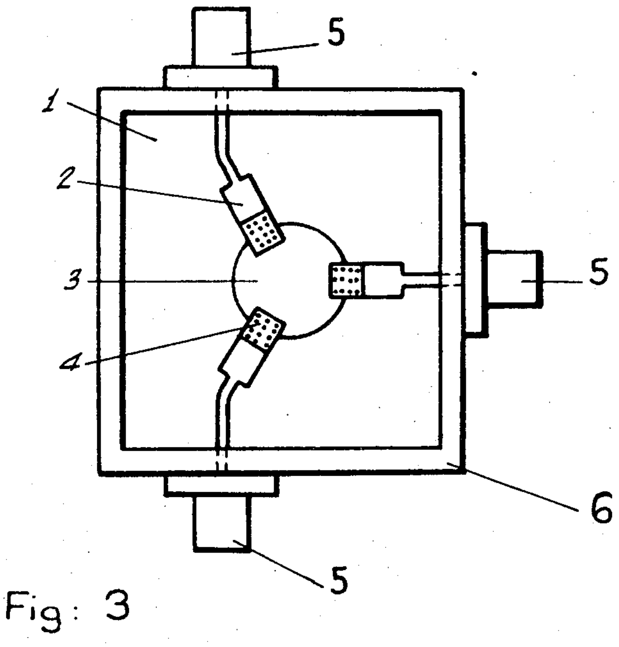
FIG. 3 is a Y circulator according to the invention.

FIG. 3 shows a Y circulator according to the invention and operating in the X band (9.5 GHz). The circuits consist mainly of a substrate 1 made of the same material as the line shown in FIGS. 1 and 1A on which are deposited three lines 2 made of thick metallic film obtained as mentioned above. The central part of the substrate has been drilled and a magnetic wafer 3 is embedded in the substrate made of a material corresponding to the formula:

$$0.92\,MgO, 0.18\,MnO, 0.8\,Fe_2O_3, 0.1\,(TiO_2\,NiO) \quad (3)$$

A 10 micron thick gold film is coated upon the magnetic material 3. Lines 2 are interconnected to wafer 3 by means of gold strips 4 welded by thermocompression. The other end of lines 2 are connected to the inner conductor of the coaxial plugs 5 which are fastened to the housing 6 according to current practice. The top of the housing has been omitted so as to show the circuit design.

Figure 4:
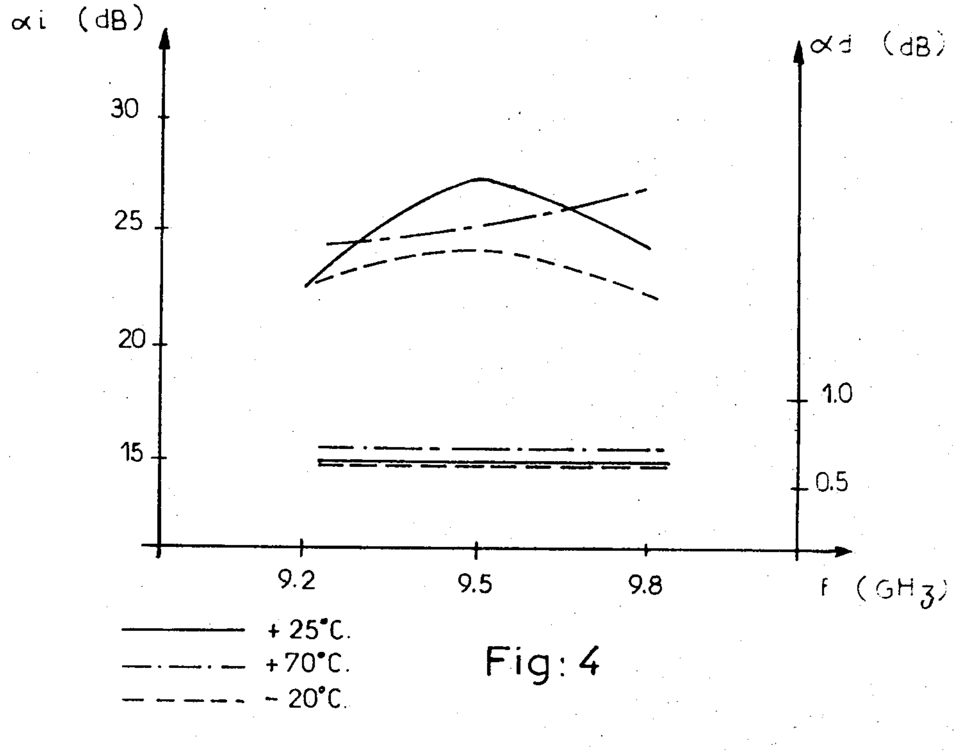
FIG. 4 is the characteristic of the circulator of FIG. 3.

The characteristics of the circulator are shown in FIG. 4. The continuous lines are measurements at 25° C, the interrupted line at −20° C and the dash-dot line at 70° C. The transmission loss (right hand scale of ordinates) is quite insensitive to frequency and remains below 0.7 dB in the frequency band 9.2 to 9.8 GHz. The influence of the temperature is very small. The upper curve (left hand scale of ordinates) shows the isolation between uncoupled arms. As appears it remains higher than 22 dB at any of the three temperatures mentioned. At normal temperature, the isolation at mid-band frequency is about 25 dB.

Figure 5:
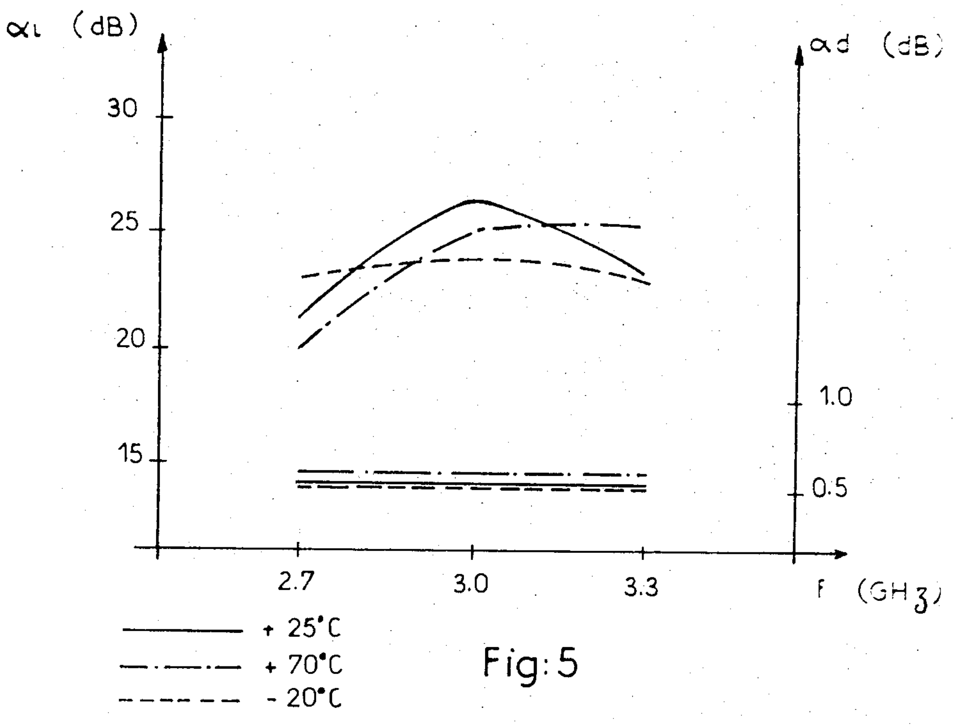
FIG. 5 shows the characteristic of a circulator using another type of substrate.

FIG. 5 shows the same characteristics for a circulator operating at 3 GHz and made of the same conductive pattern coated on a garnet type substrate. The non magnetic substrate is made of a garnet material corresponding to formula : $Y_3\,Fe\,Al_4\,O_{12}$. As shown, insertion loss is quite insensitive to temperature and remains below 0.6 dB between 2.7 and 3.3 GHz. The isolation is higher than 20 dB at any of the temperatures in the frequency band.

Figure 6:
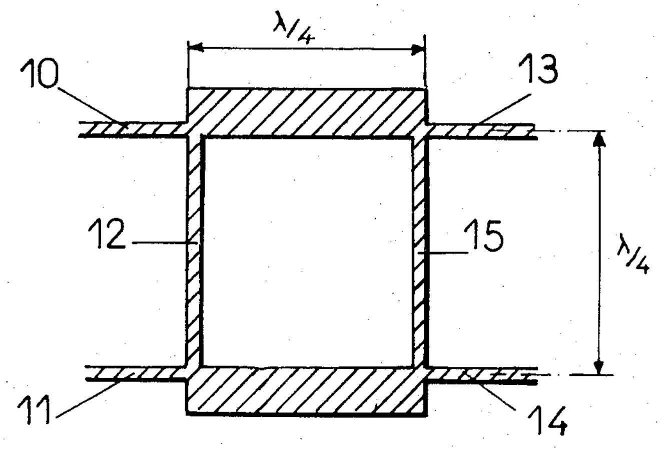
FIG. 6 shows the design of a 3 dB coupler according to the invention.

FIG. 6 shows the pattern of a 3 dB coupler operating in X band of a pattern known per se. It is made of a thick gold film coating a nonmagnetic substrate of the spinel type of the same composition as the transmission line shown in FIGS. 1 and 1A. This coupler has two 50 ohm inputs respectively 10 and 11 bridged by a 50 ohm arm 12. The two transmission lines are then widened on a quarter of wavelength section so as to present an impedance of 50 ohms/$\sqrt{2}$. Outputs 13 and 14 are 50 ohms lines bridged by a quarter wavelength arm 15.

Figure 7:
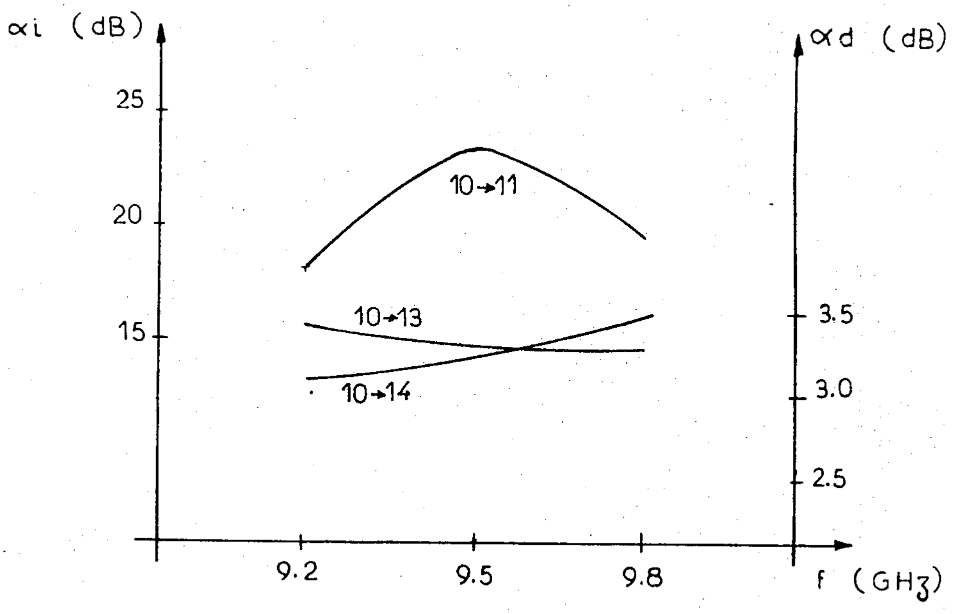
FIG. 7 shows the characteristics of the coupler of FIG. 6.

FIG. 7 shows the transmission loss $\alpha d$ between input 10 and the respectively outputs 13 and 14 corresponding to the right-hand ordinate scale and the isolation $\alpha i$ between input 10 and input 11 corresponding to the left-hand scale.

Figure 8:
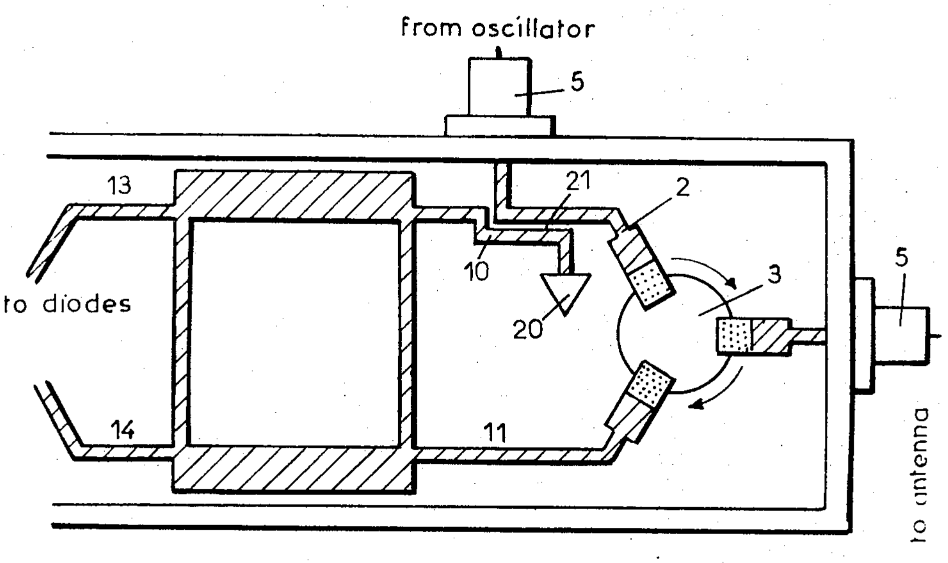
FIG. 8 shows the r.f. head of a doppler radar using the above circuits.

Sketch in FIG. 8 shows a unit made of the three circuits which have been shown respectively in FIGS. 1, 3 and 6 and which are arranged on the same nonmagnetic substrate in order to constitute the microwave head of a doppler radar operating in the X band. The characteristics of each part are shown respectively in FIGS. 2, 4 and 7. The substrate is the same as the one used for the line of FIGS. 1 and 1A. The local oscillator which acts also as the transmitter feeds the antenna through two coupled arms of the circulator. The reflected signal picked-up by the antenna is fed through the circulator to input 11 of the 3 dB coupler. The second input 10 is capacitatively coupled at 21 with the local oscillator. Two diodes are connected at the outputs 13 and 14 of the coupler. Input 10 is terminated on a matched load 20. The output from the diodes are fed through a suitable filter to the intermediate frequency channel of the radar.

What we claim:

1. Microwave integrated circuits of the microstrip type for X band operation made of a non magnetic dielectric substrate corresponding to the formula $$X\,[xLO, yR_2O_3, z(TO_2QO)], Y(TO_2\,2NO)$$

where L, Q and N are metals with divalent ions such as $Fe^{++}\,Mn^{++}\,Co^{++}\,Ni^{++}\,Mg^{++}\,ZN^{++}$;

R is a metal with trivalent ions such as:

$Fe^{+++}\,Cr^{+++}\,Al^{+++}\,Mn^{+++}$

T is titanium and $X+Y=100 \quad 90<Y<100 \; 0.96 \leq x \leq 1.04$ $y+z=2-x$ and $0.01 \leq z \leq 0.9$ with magnetic pieces embedded corresponding to the same formula with $Y \leq 90$.

2. A microwave integrated circuit of the microstrip type for L-band operation made of a non magnetic dielectric substrate corresponding to the formula $Y_3\,Fe_{5-x}\,Al_x\,O_{12}$ with $x>2.5$ with magnetic pieces embedded in said substrate corresponding to the formula $Y_3\,Fe_{5-x}\,Al_x\,O_{12}$ with $x<2.5$ 3. A microwave integrated circuit of the microstrip type made of a non magnetic Ni - Zn ferrite-like material of the formula $Ni_{1-a}\,Zn_a\,Fe_2O_4$ with a $> 0.9$ with magnetic parts of Ni - Zn ferrite embedded in said substrate.

* * * * *

UNITED STATES PATENT OFFICE
CERTIFICATE OF CORRECTION

Patent No. 3,697,901 Dated October 10, 1972

Inventor(s) Bernard Chiron, Andre Deschamps and Louis Duffau

It is certified that error appears in the above-identified patent and that said Letters Patent are hereby corrected as shown below:

Col. 1, line 2 - Cancel "lines" second occurrence.

Col. 2, line 49 - Replace "shows" with --show--.

Col. 2, line 61 - Replace "Za" with --Zn--.

Col. 3, line 16 - Replace "sold" with --gold--.

Signed and sealed this 24th day of April 1973.

(SEAL)
Attest:

EDWARD M. FLETCHER, JR.
Attesting Officer

ROBERT GOTTSCHALK
Commissioner of Patents

USCOMM-DC 60376-P69
☆ U.S. GOVERNMENT PRINTING OFFICE : 1969 O—366-334.